US007036211B1

(12) United States Patent
Panks

(10) Patent No.: US 7,036,211 B1
(45) Date of Patent: May 2, 2006

(54) PERCUSSIVE POWER TOOL PULLING DEVICE

(76) Inventor: James K. Panks, 9161 Westover Dr., Greenville, MI (US) 48838

(*) Notice: Subject to any disclaimer, the term of this patent is extended or adjusted under 35 U.S.C. 154(b) by 64 days.

(21) Appl. No.: 10/604,083

(22) Filed: Jun. 25, 2003

Related U.S. Application Data

(60) Provisional application No. 60/319,362, filed on Jun. 27, 2002.

(51) Int. Cl.
*B23P 19/00* (2006.01)
*B23P 19/04* (2006.01)
*B25B 3/46* (2006.01)

(52) U.S. Cl. ............................ 29/718; 29/243; 173/29

(58) Field of Classification Search ............... 29/426.1, 29/718, 235, 243, 252, 254, 256, 265, 270, 29/283.5, 225; 173/29, 53, 90, 95, 121
See application file for complete search history.

(56) References Cited

U.S. PATENT DOCUMENTS 2,705,982 A * 4/1955 Ponts .................... 144/208.92
4,168,751 A * 9/1979 Deike ............................ 173/1
4,495,791 A 1/1985 Kemnitz et al.
4,586,230 A 5/1986 Harydzak et al.
5,406,685 A 4/1995 Harmand
5,638,909 A * 6/1997 Henderson .................. 173/211
5,787,561 A 8/1998 Harmand

* cited by examiner

*Primary Examiner*—John C. Hong
(74) *Attorney, Agent, or Firm*—McGarry Bair PC

(57) ABSTRACT

A pulling tool comprises an air-powered internal anvil and hammer. The pulling tool is attached to the object to be removed. The hammer is urged by pressurized air to repeatedly strike the anvil, which applies a percussive force to the object, progressively removing the object from its housing. A conventional air hammer can be modified into a tool puller by replacing the air hammer bit with a cap, and attaching the object to the rear of the air hammer through a coupler. Alternatively, a cylindrically-shaped collar is slidably secured over a conventional air hammer. A pulling bit slidably communicates with a flanged rod attached to the object to be removed. Operation of the air hammer causes the pulling bit to strike the flange, progressively removing the object from its housing.

18 Claims, 14 Drawing Sheets

PERCUSSIVE POWER TOOL PULLING DEVICE

CROSS REFERENCE TO RELATED APPLICATIONS

This application claims the benefit of U.S. provisional application Ser. No. 60/319,362, filed Jun. 27, 2002, which is incorporated herein in its entirety.

BACKGROUND OF INVENTION

1. Field of the Invention

This invention relates to a pneumatically-driven tool. In one aspect, the invention relates to a device for the extraction of frictionally-fit fittings and tooling bits.

2. Description of the Related Art

Mechanical assemblies frequently utilize friction-fit components, such as fittings and tool bits, which must at times be separated. Friction pins, for example, can be used to hold two parts together. If the parts must be separated, the pin must first be removed. Generally, this is accomplished by repeatedly striking the pin with a hammer. Similarly, bearings are frequently press-fit into a housing. Removal of the bearing from the housing involves pulling or repeatedly striking the bearing until it is released. Other friction-fit or press-fit assemblies can occasionally require removal of the friction-fit or press-fit component from the remainder of the assembly.

A conventional way of removing a friction-fit or press-fit component is by rigidly attaching a pulling or pushing member to the component and applying a percussive force to the pulling member and thus to the component to be removed. The percussive force is developed by repeated striking of a heavy hammer against the member to progressively move the component out of its housing. The hammer is typically operated by hand. Consequently, the repetitive striking force can fatigue the operator and may even cause injury, particularly repetitive-motion injury.

Another means of removing a friction-fit or press-fit component is by use of a hydraulic puller comprising a hydraulic piston and cylinder assembly with a pulling member attached to the piston. The pulling member is attached to the object to be removed. The hydraulic cylinder assembly is attached to a stationary base, which is fixed with respect to the object. Hydraulic pressure is applied to the piston by a hydraulic pump, which causes the object to be removed from its housing. The hydraulic puller can comprise a relatively large assembly, which may be inconvenient or impractical for certain applications. As well, proper alignment of the device with the object to be removed may be difficult.

Yet another means is to utilize a screw-type puller in which a threaded pulling member is attached to the object and a mating threaded collar is turned against a base, gradually pulling the threaded rod and the removing attached object from the housing. As with the hydraulic puller, the screw-type puller can comprise a relatively large device having a base which must be properly aligned with the object to be removed in order to operate effectively.

The conventional pullers described above are frequently slow and require complicated assemblies which must be properly aligned with the object to be pulled and stabilized against the large pulling force that must be developed to remove the object. Human input is generally physically taxing. Shock to the various parts of the hands, arms and shoulders can cause fatigue and injury.

SUMMARY OF INVENTION

In one embodiment of the invention, a tool for removing a friction-fit or press-fit component from a seat comprises a hand-held, pneumatically-driven hammer for applying a repeating percussive force, and a coupling for interconnecting the hammer and the component, wherein the repeating percussive force is applied to the component thereby urging the component from the seat. The hammer can comprise a tool body comprising an anvil and enclosing a piston, wherein the piston strikes the anvil to apply the percussive force to the tool body. The coupling can interconnect the tool body and the component.

The tool can further comprise a spring adapted to urge the piston away from the anvil after the application of the percussive force. The coupling can comprise a tool holder, a coupling adapter, and a rod puller, and the coupling adapter can be adapted to transfer the percussive force from the tool holder to the rod puller. The coupling adapter can be adapted to enable the rod puller to translate relative to the tool holder. The coupling can comprise a sleeve adapted to slidably communicate with an exterior surface of the hammer and fixedly retain the hammer therein.

The tool can further comprise a pulling bit attached to the hammer and adapted to apply the percussive force to the component. The coupling can be attached to a forward end of the hammer or a rearward end of the hammer.

The tool can further comprise a cap having an anvil attached to the hammer for transmitting a percussive force applied to the anvil through the hammer to the component.

In another embodiment, an adapter for converting an air hammer with a reciprocating member into a tool for removing a friction-fit or press-fit component from a seat comprises a pull rod adapted to be attached to the component, and a hammer piece attached to the reciprocating member and adapted to percussively communicate with the pull rod, wherein the reciprocating member imparts a reciprocating motion to the hammer piece so that a repeating percussive force is applied to the pull rod by the hammer piece thereby urging the component from the seat. The coupling can comprise a sleeve adapted to slidably communicate with an exterior surface of the hammer and fixedly retain the hammer therein. A pulling bit can be attached to the hammer and adapted to apply the percussive force to the component.

In another embodiment, a method for removing a friction-fit or press-fit component from a seat comprises the steps of fixedly coupling a pull rod to the component so that an impact force delivered to the pull rod will be transmitted to the component, fixedly coupling the pull rod to a hand-held, pneumatically-driven hammer adapted to apply a repeating percussive force to the pull rod, and activating the hammer to apply a repeating percussive force to the pull rod, and thereby urge the component from the seat. The method can further comprise the steps of replacing a hammer bit with a cap, wherein the cap is adapted to transmit a percussive force applied thereto to the hammer, replacing the hammer bit with a pulling bit, wherein the pulling bit is adapted to transmit the percussive force from the hammer to the component, and coupling the pull rod to a rear portion of the pneumatically-driven hammer.

In yet another embodiment, a kit for converting an air hammer into a tool for removing a friction-fit or press-fit component from a seat, the air hammer comprising a body and a reciprocating member comprises a pull rod attached to the component, and a pulling member attached to the air hammer and adapted to percussively communicate with the pull rod.

In yet another embodiment, a hand-held, pneumatically-driven hammer comprises a mounting portion at a rear portion of the hammer, the mounting portion being adapted to fixedly couple a component thereto, the component being frictionally retained in a component seat, wherein the hammer is adapted to be a tool puller for removing the component from the component seat. The mounting portion can comprise threads adapted for threadable connection with the component, a bayonet-type connection, or a collar and at least one set screw.

BRIEF DESCRIPTION OF SEQUENCES

DETAILED DESCRIPTION

Figure 1:
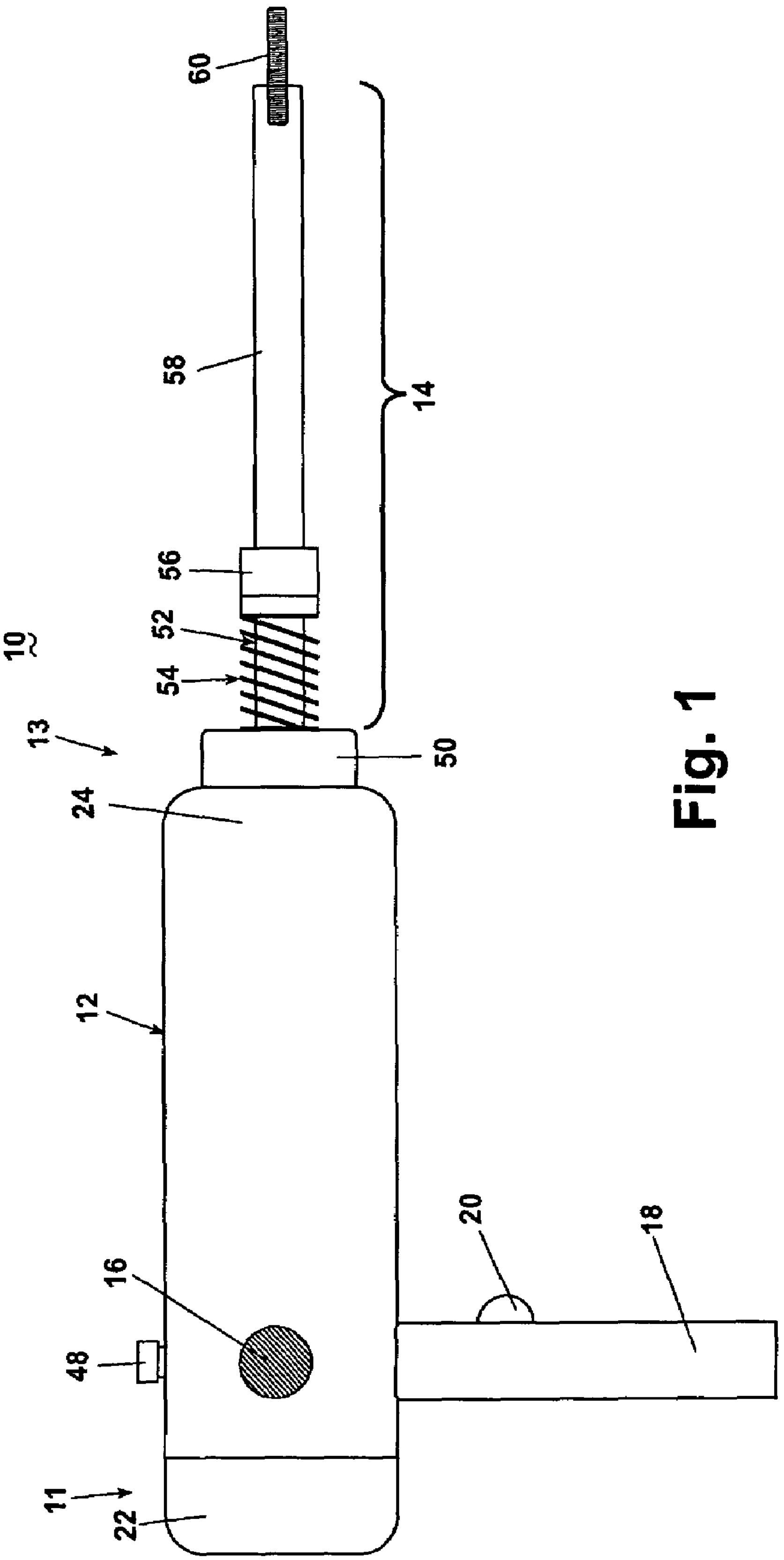
FIG. 1 is a side view of a first embodiment according to the invention comprising a pneumatic percussive pulling tool.
Figure 2:
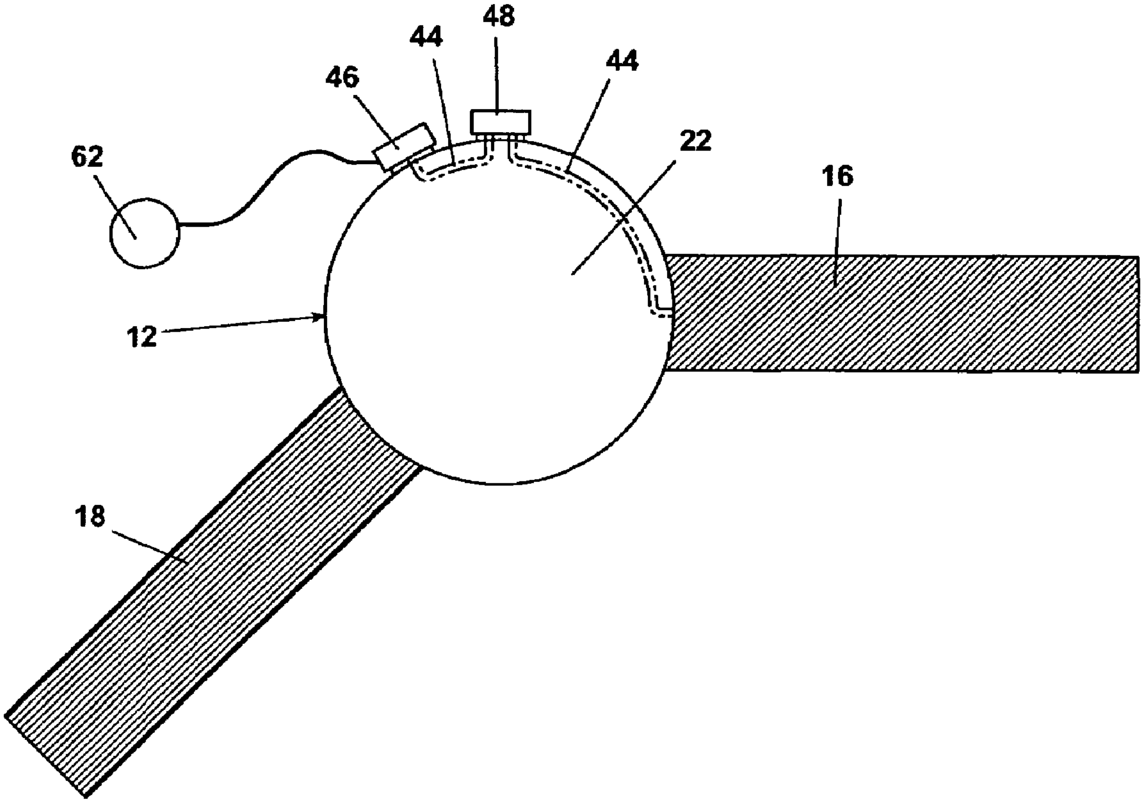
FIG. 2 is an end view from the rear of the pneumatic percussive pulling tool of FIG. 1.
Figure 3:
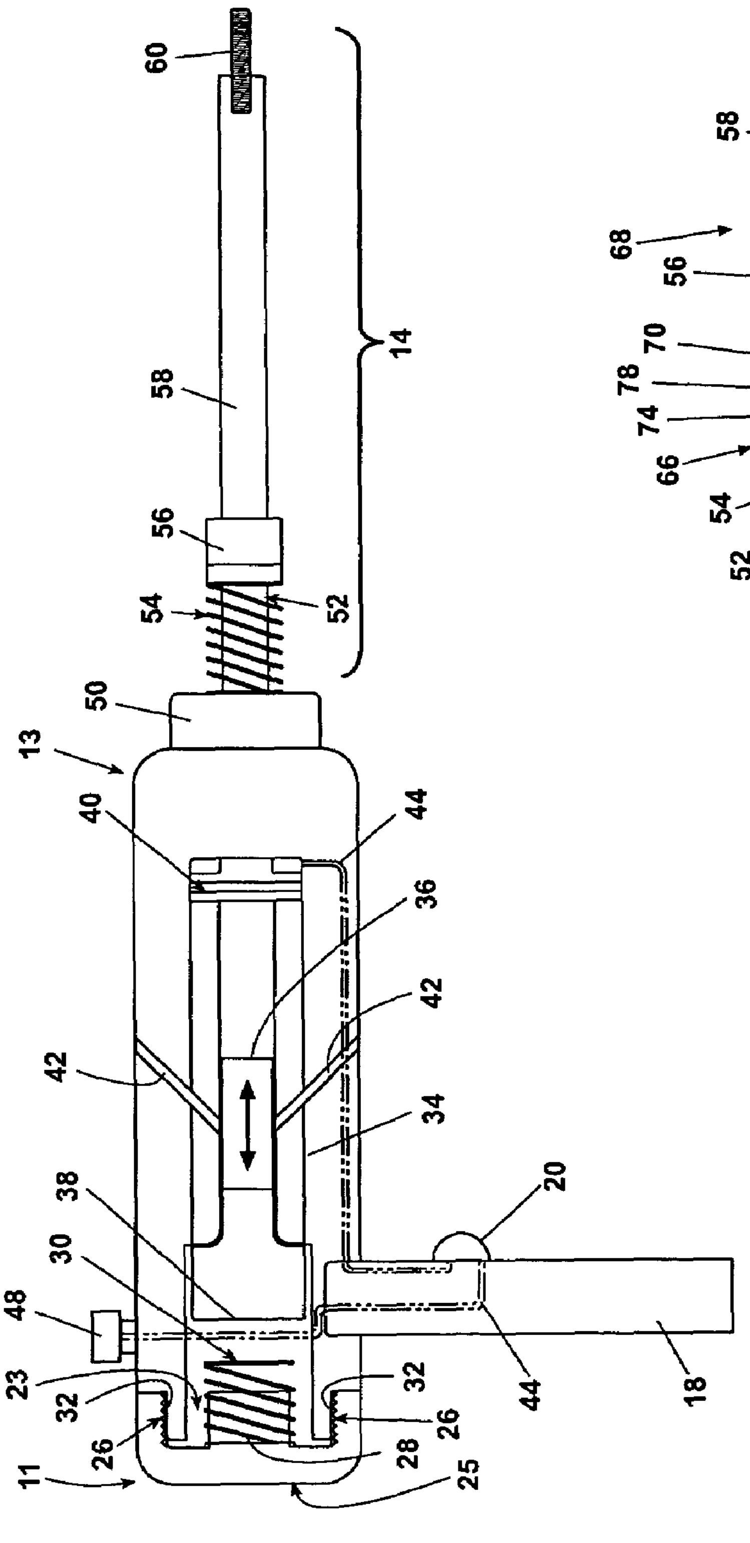
FIG. 3 is a cutaway view of the interior of the pneumatic percussive pulling tool of FIG. 2.

Referring now to FIG. 1, a first embodiment of the invention comprising a pneumatic percussive pulling tool 10 is shown. The pulling tool 10 comprises a tool body 12 and a rod assembly 14. The tool body 12 is a generally cylindrically shaped body having a hollow interior, as shown in FIG. 3, to which are rigidly attached handles 16, 18 extending laterally therefrom, as shown in FIG. 2, thereby providing a tool having the general configuration of a conventional hammer drill. The handle 18 comprises a trigger 20 for activating the pulling tool 10.

The tool body 12 comprises an anvil cap 22 and a cylinder body 24. The anvil cap 22 is a generally cuplike member having an open end 23 and a closed end 25. The open end 23 is provided with female threads 26 extending circumferentially around the interior thereof. The closed end 25 comprises a cylindrically-shaped anvil 28 coaxial with the anvil cap 22 and extending into the interior thereof. A spring 30 is slidably received over the anvil 28 to extend into the cylinder body 24 when the anvil cap 22 is connected to the cylinder body 24 as hereinafter described.

The cylinder body 24 comprises a proximal end 11 and a distal end 13. The proximal end 11 is provided with male threads 32 adapted to matingly engage the female threads 26 of the anvil cap 22 and thereby secure the anvil cap 22 to the proximal end 11 of the cylinder body 24. The distal end 13 of the cylinder body 24 is adapted to receive the rod assembly 14, as hereinafter described.

The cylinder body 24 comprises a generally cylindrically-shaped cylinder cavity 34 coaxial with the cylinder body 24, opening toward the proximal end 11, and closed at the distal end 13. The cylinder cavity 34 comprises a first portion 35 having a first diameter adapted to slidably receive a piston 36 and a second portion 37 having a second, larger diameter adapted to slidably receive a ram 38. Intermediate the distal end 13 and the proximal end 11 are a plurality of exhaust ports 42 extending laterally outwardly from the cylinder cavity 34 to the exterior of the cylinder body 24. As shown in FIG. 3, the exhaust ports 42 are inclined toward the distal end 13. The preferred embodiment comprises two exhaust ports 42 comprising elongated cylindrical passageways having a diameter adapted to control the exhaustion of pressurized air from the cylinder body 24.

As shown in FIGS. 2 and 3, the cylinder body 24 is provided with air supply passageway 44 fluidly interconnecting a conventional air inlet 46, a conventional air regulator 48, the trigger 20, and the cylinder cavity 34. The air inlet 46 is adapted to fluidly interconnect to a conventional supply of pressurized air 62 utilizing conventional pressure fittings. The air regulator 48 is adapted to regulate the pressure of the air delivered to the cylinder cavity 34. The trigger 20 is adapted to allow the passage of the air from the regulator 48 to the distal end 13 of the cylinder cavity 34 when the trigger 20 is activated, such as by manual depression.

The piston 36 slides within the cylinder cavity 34 and is urged toward the proximal end 11 when pressurized air is introduced into the distal end 13 of the cylinder cavity 34 through the air supply passageway 44. A valve assembly 40 is installed at the closed end of the cylinder cavity 34 and fluidly interconnected with the air supply passageway 44. The valve assembly 40 is adapted to deliver a selected volume of pressurized air into the cylinder cavity 34 sufficient to move the piston 36 the required distance for operation of the pulling tool 10.

Figure 3A:
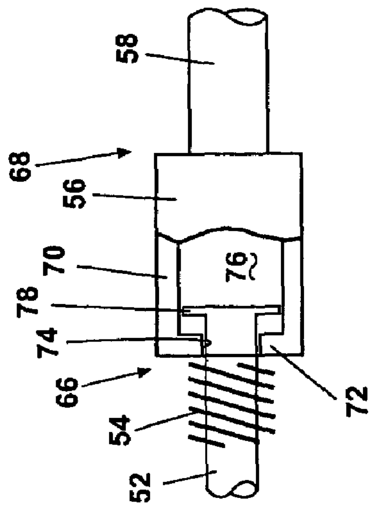
FIG. 3A is a fragmentary sude elevational view showing a portion of the air hammer of FIG. 3 in greater detail.
Figure 4A:
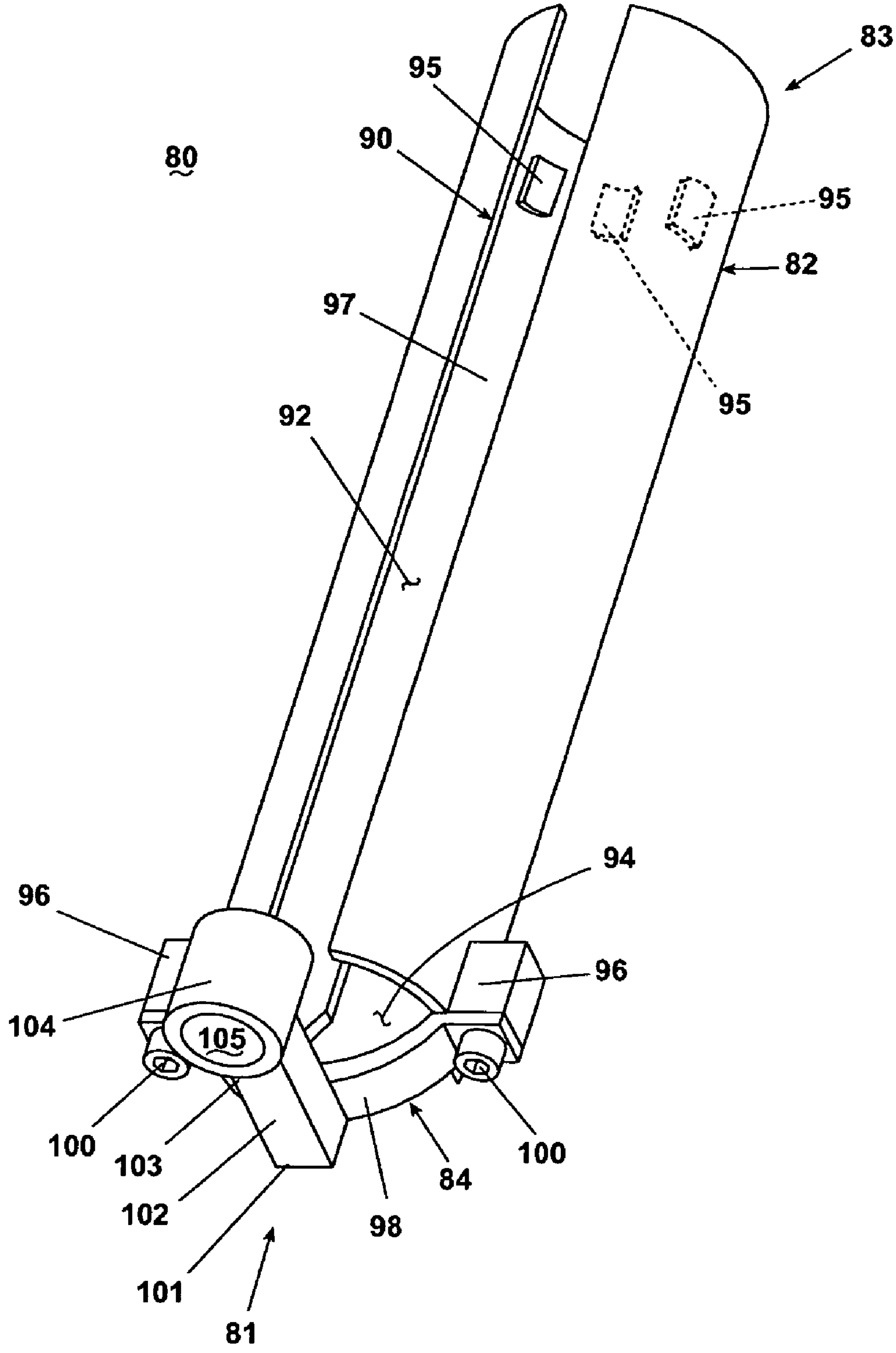
FIG. 4A is a perspective view of a second embodiment according to the invention comprising an air hammer housing for converting an air hammer to a pneumatic percussive pulling tool.
Figure 4B:
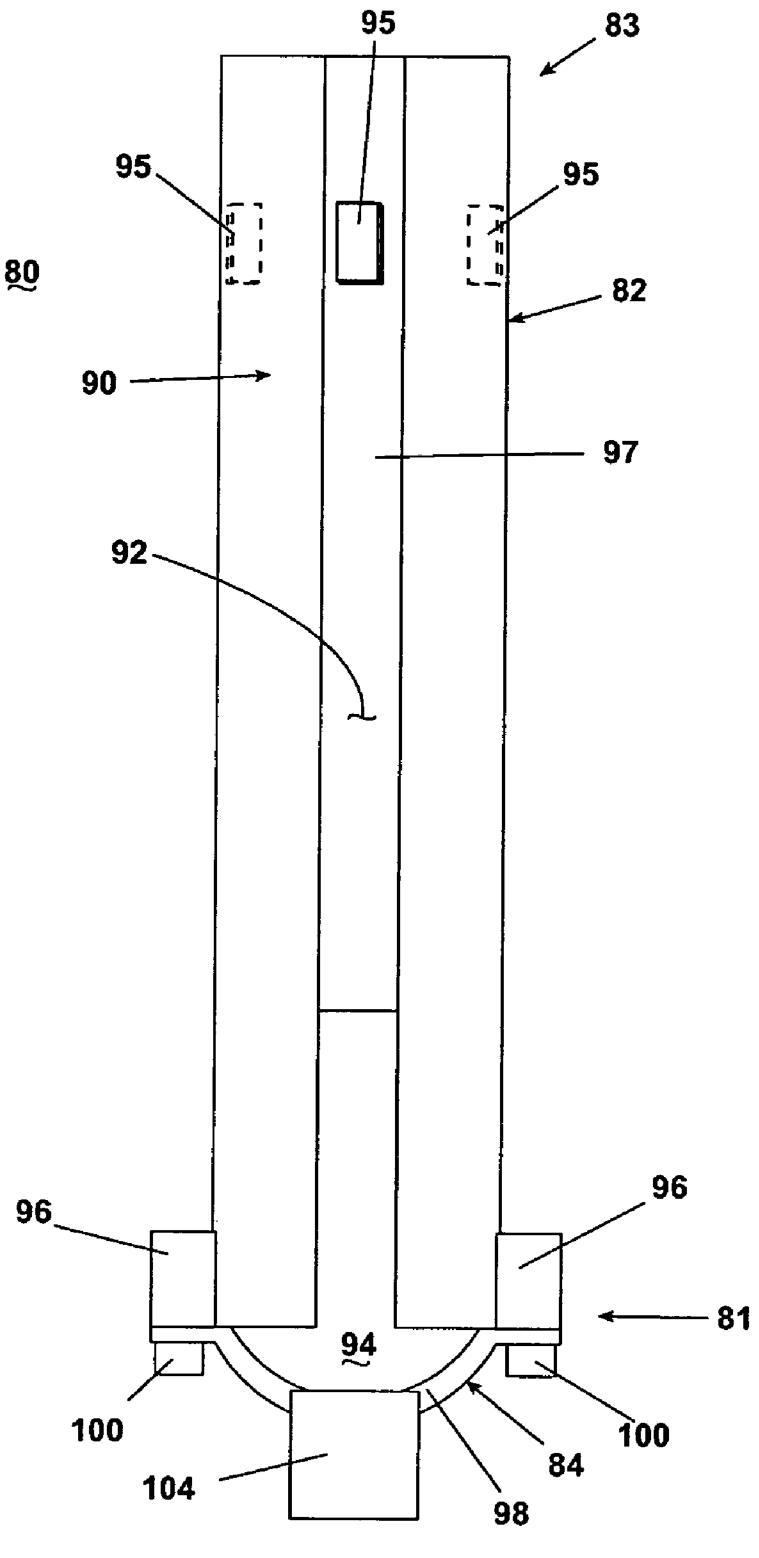
FIG. 4B is a top plan view of the air hammer housing of FIG. 4A.

A coupler is used to connect the tool body 12 to the rod assembly 14. As shown in FIGS. 1, 3, and 3A, a first embodiment of the coupler is shown comprising a rod connector 50 comprising a generally cylindrical body rigidly attached to the distal end 13 of the cylinder body 24, axially aligned therewith, and adapted to rigidly connect the cylinder body 24 to the rod assembly 14 through a tool holder 52, such as by a threaded connection for threading the tool holder 52 into the rod connector 50. The tool holder 52 is a generally rod-like member having an annular flange 78 at a free end thereof, adapted to slidably communicate with a coupling adapter 56 for connecting the tool holder 52 to a puller rod 58. The coupling adapter 56 is a hollow, generally cylinder-shaped body having a tool holder end 66 and a pull rod end 68. The coupling adapter 56 comprises an annular wall 70 defining a cylindrical chamber 76 adapted to slidably receive the annular flange 78. The annular wall 70 terminates at the tool holder end 66 in an inwardly-extending annular shoulder 72 defining a tool holder aperture 74 adapted to slidably receive the tool holder 52. The annular shoulder 72 is adapted to operably cooperate with the annular flange 78 to prevent the separation of the tool holder 52 from the coupling adapter 56. The tool holder 52 slidably receives a spring 54 therearound, which is in contact with the rod connector 50 and the coupling adapter 56, and which is adapted to urge the annular flange 78 against the annular shoulder 72. The puller rod 58 is an elongated generally rod-like member rigidly connected to the coupling adapter 56 at the puller rod end 68 and adapted to be removably connected, such as by a threaded connection, to a fitting 60 frictionally or press-fit into a seat for removal of the fitting 60 from the seat using the pulling tool 10.

The operation of the pulling tool 10 will now be described. The pulling tool 10 is connected to the air supply 62 and to the fitting 60 to be removed. An operator grasps both handles 16, 18 exerting a slight pulling force on the pulling tool 10 and the fitting 60. The operator the depresses the trigger 20 which delivers pressurized air through the passageway 44 to the valve assembly 40. The valve assembly 40 delivers a preselected volume of highly pressurized air to the cylinder cavity 34, accelerating the piston 36 towards the ram 38 and the proximal end 11, the piston 36 impacts the ram 38, propelling it into the anvil 28, compressing the spring 30. As the ram 38 impacts the anvil 28, the piston 36 clears the exhaust ports 42, and the pressurized air in the cylinder cavity 34 is exhausted through the exhaust ports 42. With the pressurized air removed from the cylinder cavity 34, the spring 30 urges the piston 36 and the ram 38 back toward the distal end 13, when the process is repeated. The rapid succession of impacts of the ram 38 against the anvil 28 drives the tool puller 10 away from the fitting 60, gradually extracting the fitting 60 from the seat.

The rapid return of the piston 36 and the ram 38 toward the distal end 13 caused by the spring 30 exerts a force on the pulling tool 10 toward the fitting 60, which would tend to drive the fitting 60 back in place, thereby preventing its removal. The spring 54 and the sliding coupling adapter 56 absorb the forward-directed shock from the tool puller 10, thereby preventing the fitting 60 from being driven back into the seat by the rebound of the pulling tool 10.

Referring now to FIGS. 4–7, a second embodiment of the invention is shown comprising an air hammer housing 80 adapted for conversion of a conventional air hammer 88 into a pulling tool. In this embodiment, the air hammer housing 80 comprises the coupling and the anvil assembly. Referring to FIGS. 4A–4B, the air hammer housing 80 comprises a sleeve portion 82, a pull rod support assembly 84, and a pulling bit 86. The sleeve portion 82 is a generally cylindrically-shaped body, having a proximal end 81 and a distal end 83, comprising a hollow tube 90 and a longitudinally-extending channelway 92 extending the length of the sleeve portion 82. Diametrically opposite to the channelway 92 at the proximal end 81 is a handle cutout 94 adapted to receive the handle of the air gun 88, as hereinafter described. At the proximal end 81 are a pair of diametrically-opposed mounting blocks 96 adapted to threadably receive a threaded connection 100, such as a cap screw. A plurality of stop blocks 95 comprising generally rectilinear block-like bodies are fixedly attached to the inside surface 97 of the sleeve portion 82 near the distal end 83.

The pull rod support assembly 84 comprises an arcuate band 98, a rod guide support block 102, and a rod guide 104. The arcuate band 98 is provided with an aperture at each end axially aligned with an aperture in each mounting block 96 for receipt of the threaded connector 100 therethrough. The rod guide support block 102 is a rectilinear, somewhat elongated block-like body having a first end 101 and a second end 103. The first end 101 is rigidly attached to the midpoint of the arcuate band 98 to extend laterally therefrom. The rod guide 104 is a generally cylindrical collar-like body rigidly attached at its circumference to the second end 103 of the rod guide support block 102 so that the axis of the rod guide 104 is orthogonal to the axis of the arcuate band 98. The pull rod support assembly 84 is attached to the sleeve portion 82 with the threaded fasteners 100 so that the arcuate band 98 extends diametrically across the sleeve portion 82 and the axis of the rod guide 104 is parallel to the axis of the channelway 92 and the axis of the sleeve portion 82.

Figure 5A:
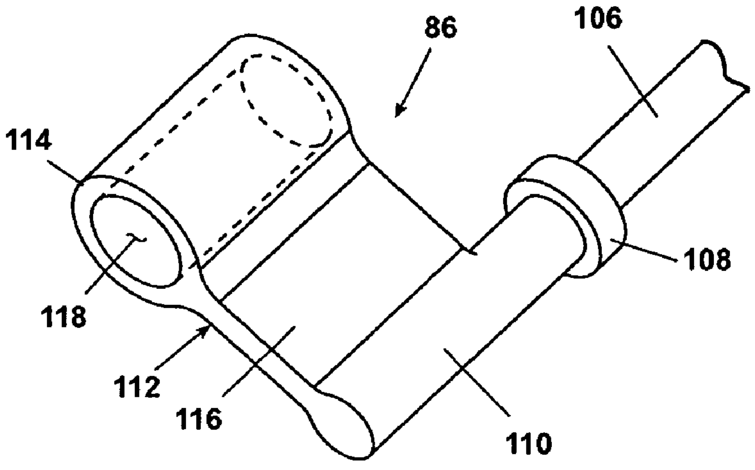
FIG. 5A is a perspective view of a pulling bit comprising a part of the air hammer bit of FIG. 4A.
Figure 5B:
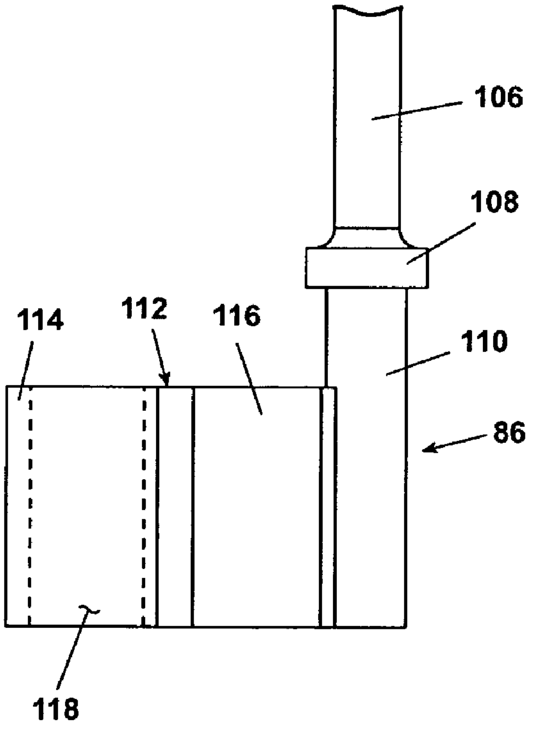
FIG. 5B is a side elevational view of the pulling bit of FIG. 5A.
Figure 5C:
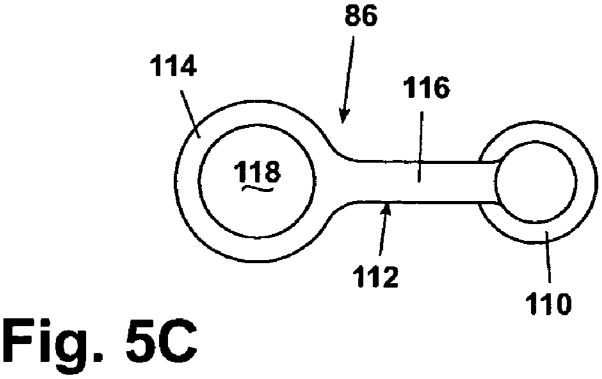
FIG. 5C is an end elevational view of the pulling bit of FIG. 5A.
Figure 7:
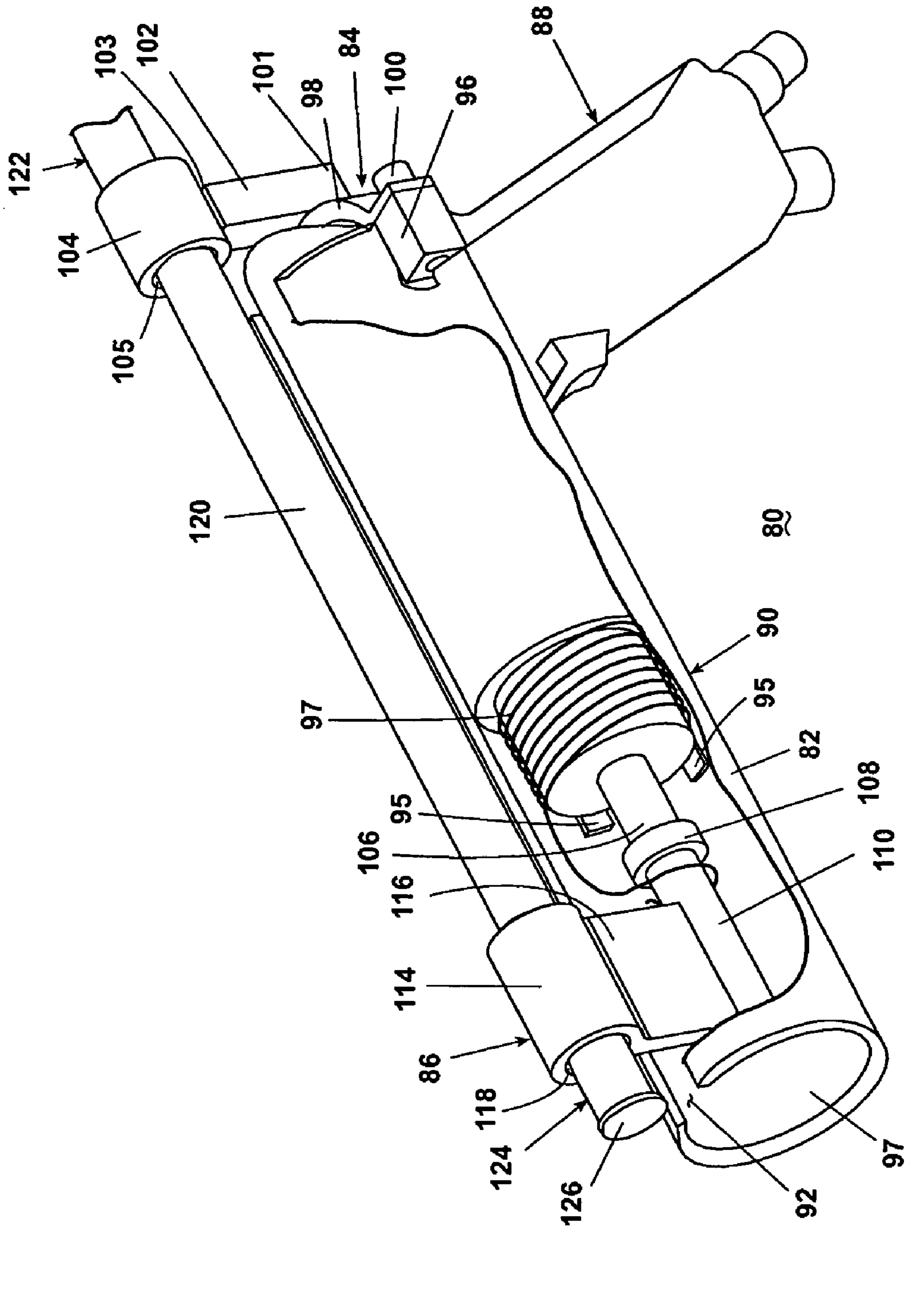
FIG. 7 is a cutaway view of the assembly of FIG. 6.

Referring to FIGS. 5A–5C, a pulling bit 86 is an irregularly-shaped body comprising a retaining flange 108, a rod portion 110, and a hammer portion 112. The retaining flange 108 is adapted to rigidly connect the pulling bit 86 to a hammer rod 106 as shown in FIGS. 5A and 7. The rod portion 110 is a generally rod-like member axially aligned with the retaining flange 108, in axial alignment with the hammer rod 106. The hammer portion 112 comprises a hammer 114 rigidly connected in a longitudinal direction to a flange 116 which is in turn rigidly connected to the rod portion 110 extending laterally therefrom. The hammer 114 is a generally cylindrical collar-like body having an aperture 118 therethrough. A conventional return spring 97 retains the pulling bit 86 to the air hammer 88 in a well-known manner.

Figure 6:
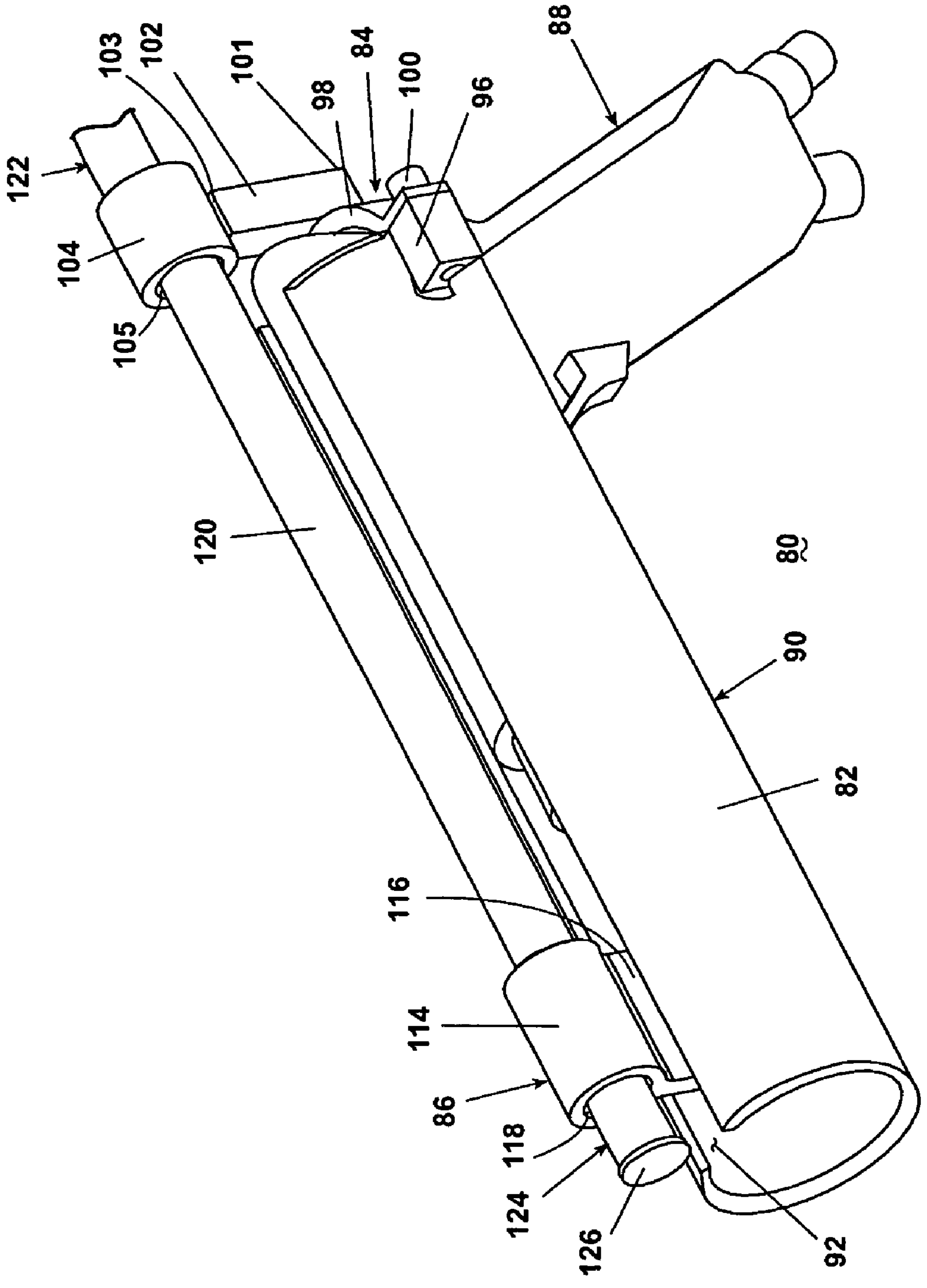
FIG. 6 is a perspective view of the pulling bit of FIG. 5A assembled over an air hammer.

Referring to FIG. 6, a rod 120 is an elongated rod like member adapted to be slidably inserted through the apertures 105 and 118, and attached through suitable means at a first end 122 to the fitting to be removed (not shown). A second end 124 of the pull rod 120 terminates in a circular flange 126 having a diameter somewhat greater than the diameter of the pull rod 120. The flange 126 is adapted to bear against the hammer 114. Or, alternatively, a common, manual slide-hammer rod can be used without departing from the scope of this invention.

Referring to FIGS. 6 and 7, the air hammer housing 80 is assembled to an air hammer 88 by inserting the air hammer 88 into the air hammer housing 80 so that the air hammer handle extends through the handle cutout 94. The arcuate band 98 is attached to the sleeve portion 82 so that the air hammer 88 is forcibly held against the stop blocks 95 by the arcuate band 98. The pulling bit 86 is attached to the hammer rod 106 through the retaining flange 108 so that the pulling bit 86 extends through the upper slot 92. The pull rod support assembly 84 is attached to the sleeve portion 82 so that the aperture 118 is axially aligned with the aperture 105. The pull rod 120 is first inserted through the aperture 118 followed by the aperture 105, and the first end 122 is rigidly attached to the fitting to be removed. The assembly is then brought toward the second end 124 of the pull rod 120 so that the flange 126 bears against the hammer 114. The air hammer 88 is actuated so that the hammer 114 repeatedly strikes the flange 126, transmitting a percussive pulling force to the fitting and thereby removing the fitting.

Figure 8:
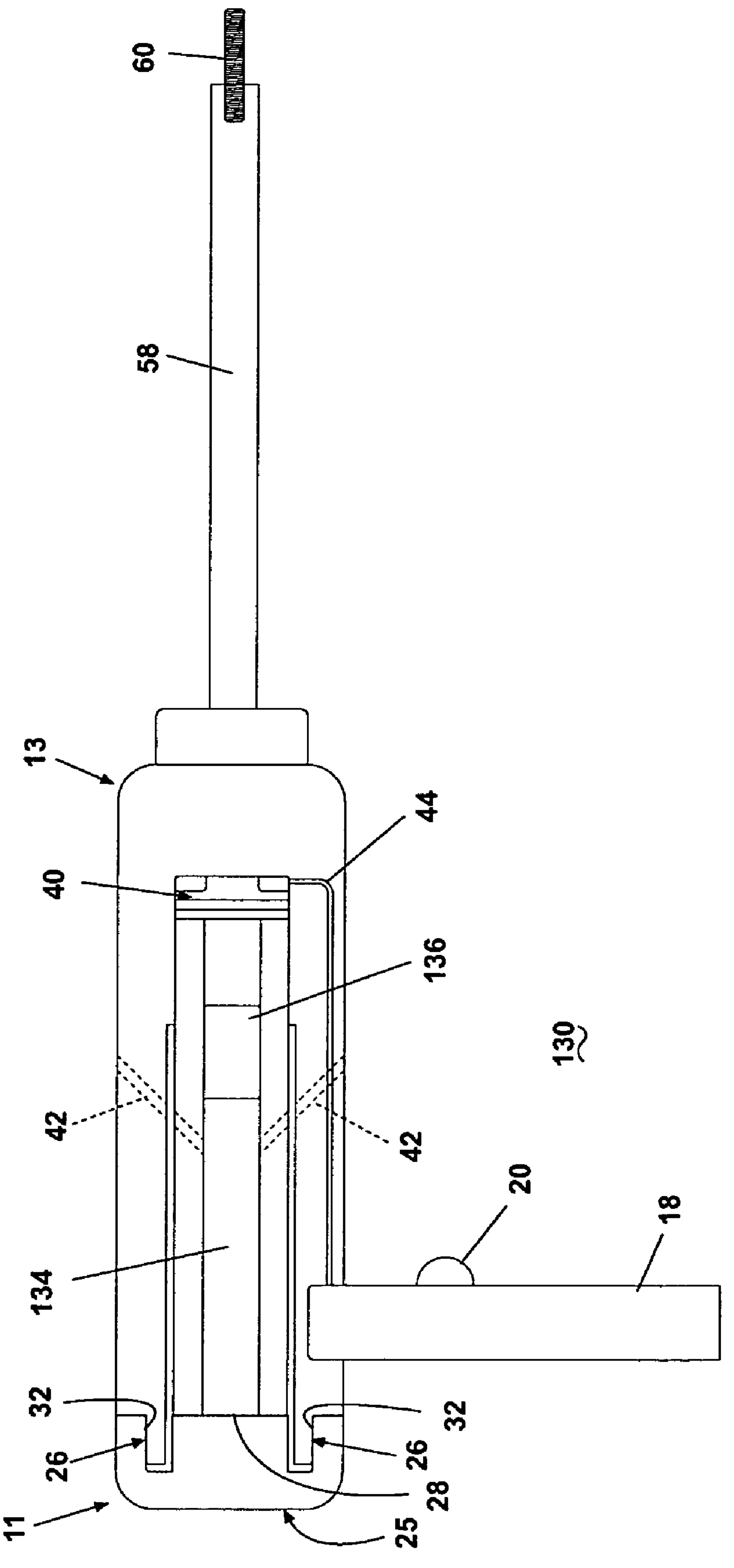
FIG. 8 is a cutaway view of a third embodiment according to the invention comprising a pneumatic percussive pulling tool.

FIG. 8 illustrates a third embodiment of the invention comprising a pneumatic percussive pulling tool 130 which is similar in most respects to the pulling tool 10 shown in FIGS. 1–3. Thus, like numerals will be used to identify like elements. The pulling tool 130 differs from the pulling tool 10 in that the pulling tool 130 comprises a single cylinder-shaped piston 136 rather than the combined piston 36 and ram 38 of the pulling tool 10. Furthermore, the piston 136 travels in a cylinder cavity 134 having a constant diameter, rather than the dual-diameter cylinder cavity 34 of the pulling tool 10.

The pull rod 58 of the pulling tool 130 is attached directly to the rod connector 50 rather than through a tool holder 52, spring 54, and coupling adapter 56, as with the pulling tool 10. A spring in communication with the anvil 28 is unnecessary for returning the piston 136 to the distal end 13 of the tool body 12 at the completion of each stroke. The pulling tool 130 operates in the same manner as the pulling tool 10.

Figure 9:
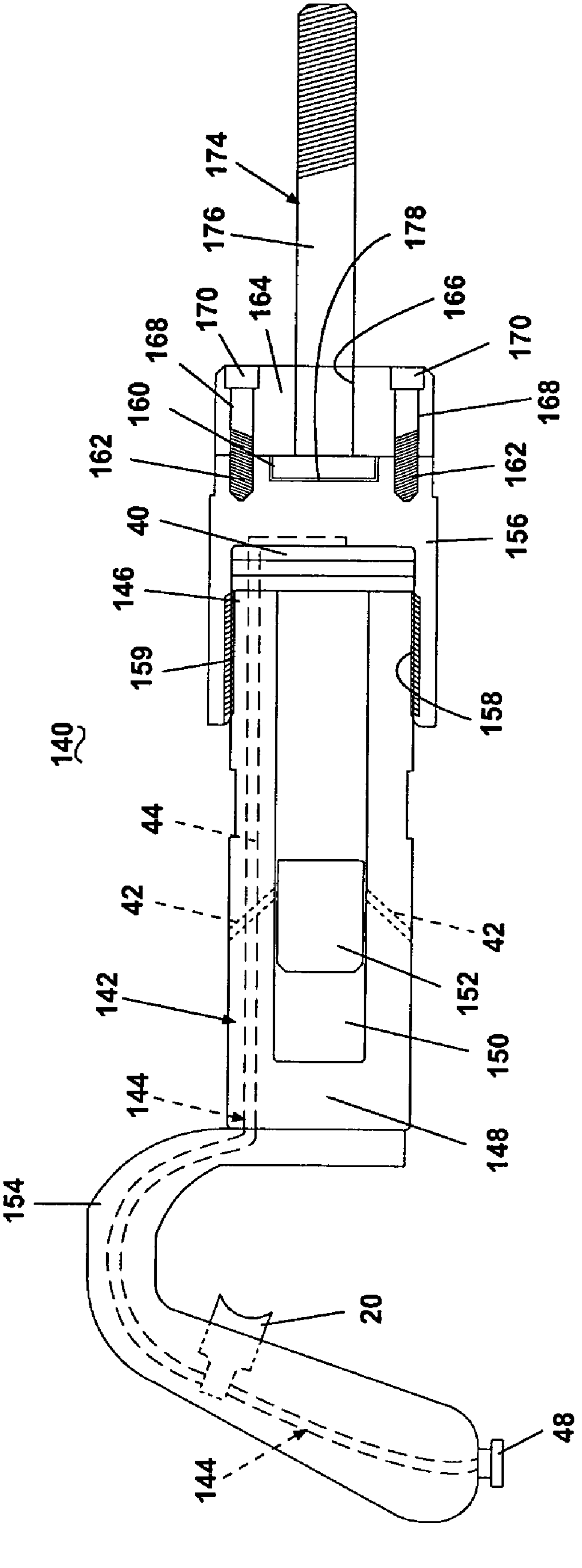
FIG. 9 is a cutaway view of a fourth embodiment according to the invention comprising a pneumatic percussive pulling tool.

FIG. 9 illustrates a fourth embodiment of the invention comprising a pneumatic percussive pulling tool 140 which is similar to the pulling tool 130 shown in FIG. 8, with the exception of the handle and the attachment of the pulling tool 130 to the rod assembly 14. Thus, like numerals will be used to identify like elements.

The pulling tool 140 comprises a cylinder 142 having a closed proximal end 144 and an open distal end 146. The proximal end 144 comprises an anvil wall 148. A cylindrical bore 150 extends from the anvil wall 148 to the distal end 146 and is adapted to slidably receive a piston 152. A handle 154 is attached to the proximal end 144. An air supply passageway 44 extends through the handle 154 from the regulator 48, through the trigger 24 in fluid communication with the valve assembly 40.

A tool cap 156 is a generally cylindrical body having at one end an annular wall defining a cylinder well 158 which is adapted to fixedly receive the distal end 146 of the cylinder 142, preferably by means of a threaded section 159. The end of the tool cap 156 is provided adjacent its perimeter with a plurality of evenly-spaced threaded wells 162 adapted for threadable receipt of cap screws 170. A shallow, cylindrical pull rod chamber 160 is centered coaxially in the end of the tool cap 156.

A tool rod coupler 164 is a generally cylindrical-shaped body adapted for cooperative communication with the tool cap 156. A plurality of cap screw apertures 168 is provided adjacent its perimeter in mating coaxial alignment with the threaded wells 162 so that the cap screws 170 can be inserted through the apertures 168 to be threaded into the threaded apertures 162 to attach the tool cap 156 to the tool rod coupler 164. The coupler 164 is also provided with a pull rod aperture 166 extending coaxially therethrough for mating communication with the pull rod chamber 160. A pull rod 174 is an elongated rod-like member comprising a shaft 176 and a flange head 178. The shaft 176 is adapted for slidable communication with the pull rod aperture 166, and the end of the flange head 178 is adapted for cooperative receipt in the pull rod chamber 160. When the coupler 164 is attached to the tool cap 156 with the pull rod 174 installed in the pull rod chamber 160, the pull rod 174 will be fixedly attached to the tool cap 156 and, thus, to the percussive pulling tool cylinder 142.

The operation of the percussive pulling tool 140 is generally the same as previously described. Compressed air delivered through the valve assembly 40 into the bore will drive the piston 152 against the anvil wall 148. The percussive force will be applied through the cylinder 142 to the tool cap 156 and the coupler 164, and thence to the pull rod 174 and the item to be removed.

Figure 10:
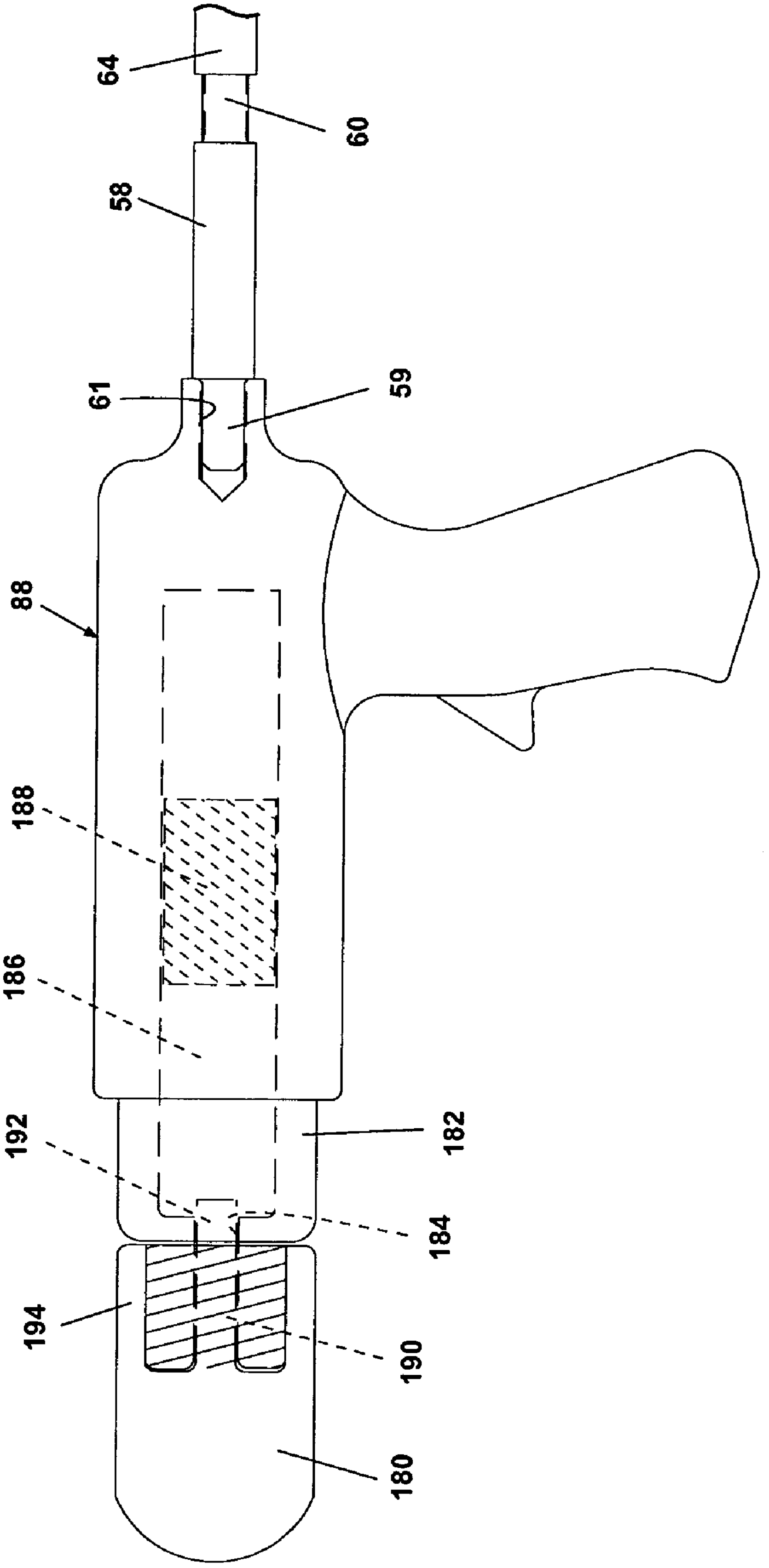
FIG. 10 is a cutaway view of a fifth embodiment according to the invention comprising a cap and adapter for converting an air hammer to a pneumatic percussive pulling tool.
Figure 13:
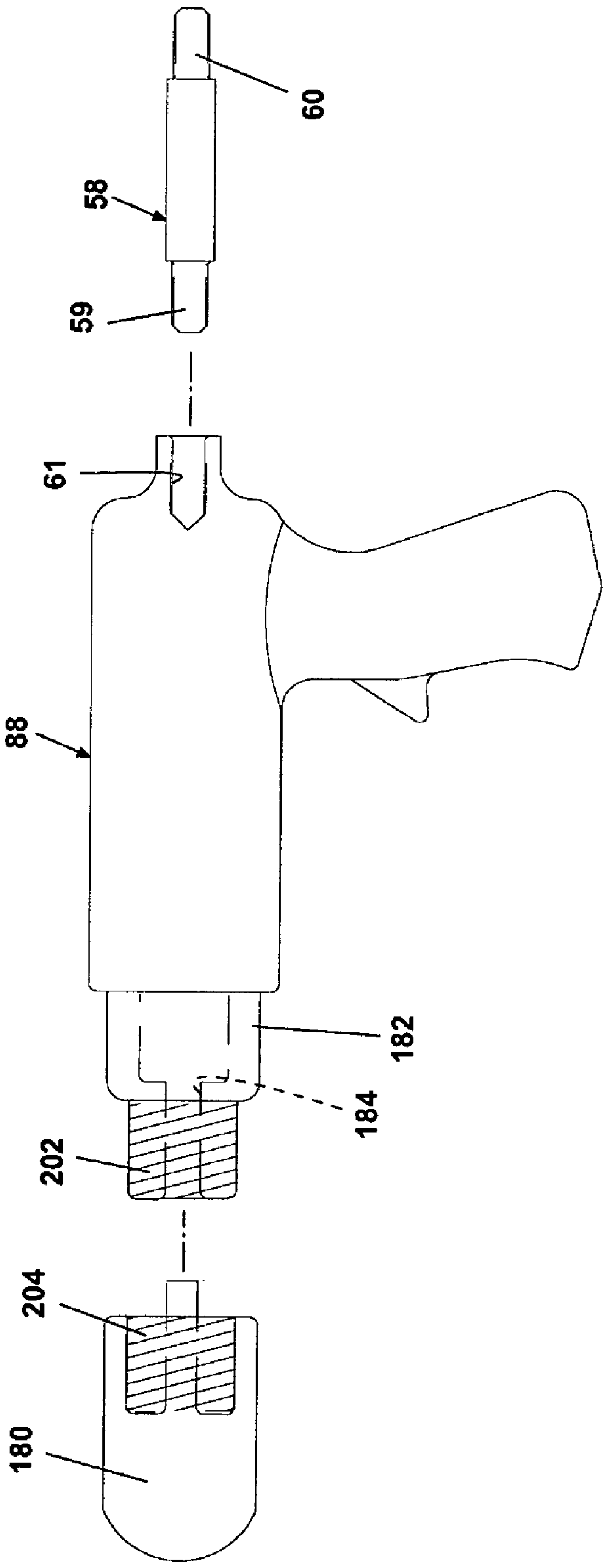
FIG. 13 is an exploded view of the air hammer shown in FIG. 11 illustrating a second step in the conversion of the air hammer to a pulling tool.

FIGS. 10 and 13 illustrate a fifth embodiment of the percussive pulling tool which comprises a conventional air hammer 88 which has been modified into a pulling tool. The air hammer 88 is provided with a cylinder portion 182 defining an internal cylindrical chamber 186 and a cylindrical piston 188 adapted for slidable movement within the chamber 186. As compressed air is delivered to the chamber 186, the piston 188 is urged to the front of the air hammer 88 in a well-known manner.

Figure 11:
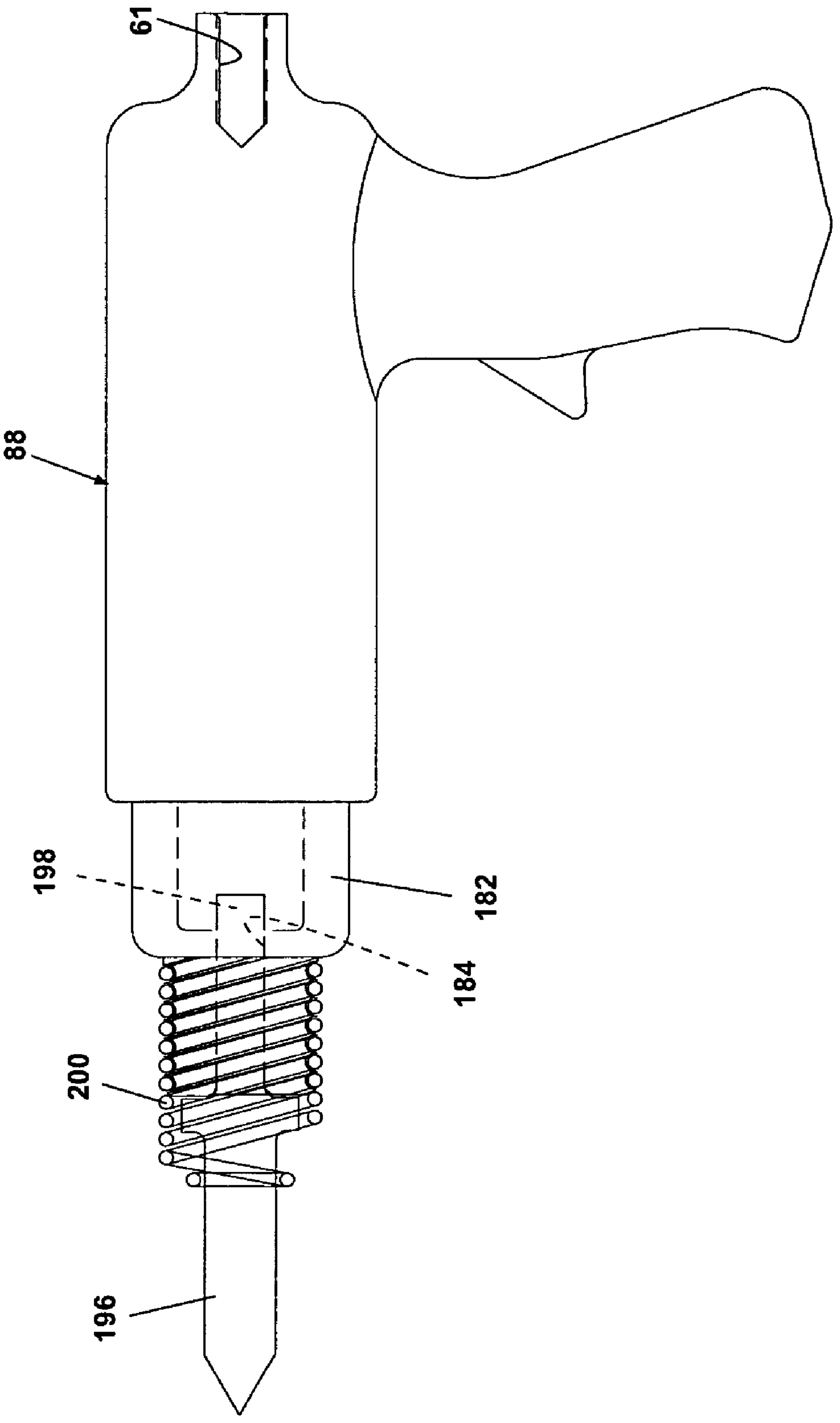
FIG. 11 is a partial sectional view of the air hammer shown in FIG. 10 prior to conversion to a pulling tool.
Figure 12:
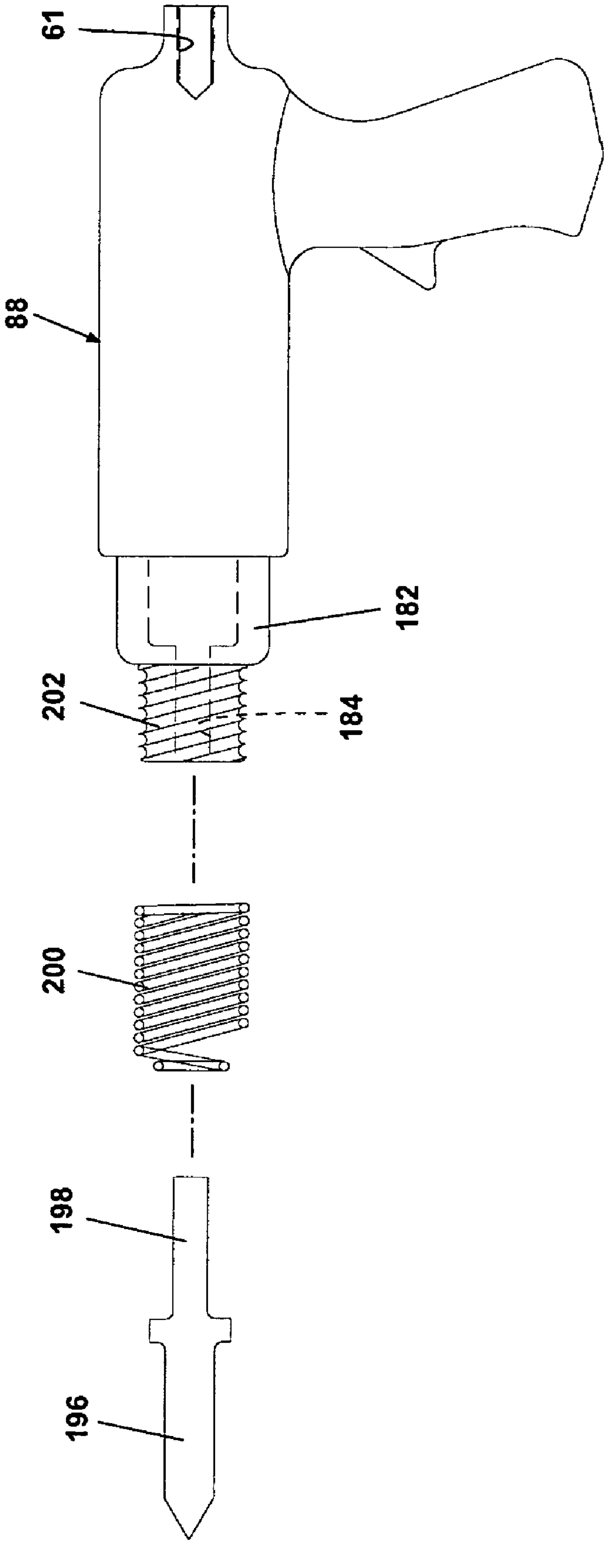
FIG. 12 is an exploded view of the air hammer shown in FIG. 11 illustrating a first step in the conversion of the air hammer to a pulling tool.

Looking at FIGS. 11 and 12, the air hammer 88 is typically provided with a hammer bit 196 terminating at one end in an anvil 198. The air hammer 88 is also provided with a coil spring 200 which is adapted to be threaded onto a threaded spring mount 202 extending coaxially from the end of the cylinder 182. An aperture 184 extends through the threaded spring mount 202 to communicate with the chamber 186. The bit 196 is attached to the cylinder 182 by inserting the anvil 198 through the aperture 184 and threading the coil spring 200 onto the threaded spring mount 202. The coil spring 200 and the hammer bit 196 are adapted for cooperative communication so that the spring 200 retains the anvil 198 in the aperture 184 while allowing slidable movement of the hammer bit 196 relative to the cylinder 182. As the piston 188 is urged by the compressed air to strike the anvil 198, the hammer bit 196 will be driven away from the cylinder 182. However, the spring 200 will extend with the movement of the hammer bit 196 and will prevent the hammer bit 196 from being expelled from the air hammer 88, in a well-known manner.

Referring again to FIGS. 10 and 13, a pull cap 180 is a generally cylindrical-shaped body having an annular wall 194 at one end and a cylindrical anvil post 190 extending coaxially relative to the annular wall 194. The annular space between the annular wall 194 and the anvil post 190 is provided with cap threads 204 adapted for threadable communication with the threaded spring mount 202. Additionally, set screws can be used to secure the pull cap 180 to the spring mount. The cap 180 is threaded onto the cylinder 182 so that the anvil post 190 extends through the aperture 184 into the chamber 186, and the cap 180 will be fixedly attached to the cylinder 182. When the piston 188 strikes the anvil post 190, the impact will be transmitted through the cap 180 to the cylinder 182 and the body of the air hammer 88.

The butt end of the air hammer 88 is modified with a seat 61 for attachment of the pull rod 58 thereto. Preferably, the seat 61 is threaded and the pull rod 58 is attached by threading a threaded stud 59 therein. The fitting 60 is fixedly attached to the tool assembly 64 as previously described. Thus, percussive force applied to the body of the air hammer 88 will be transmitted to the pull rod 58 and the tool assembly 64 (i.e., the fitting to be removed) for removal of the tool assembly 64 from its seat. Alternatively, the seat 61 can be adapted for attachment of the pull rod 58 in a well-known manner through a collar and one or more radially-oriented set screws, or a bayonet-type connection.

The unique invention described herein is easy to assemble and use. In the embodiments shown herein, the invention provides a way to use an existing air hammer as a pulling tool and, in other embodiments, a new-style air hammer body and attachments are shown that provide a way by which an air hammer can be easily used as a pulling tool. The invention requires only a single supply of readily available pressurized air. The invention eliminates the manual effort and impact stresses to the operator resulting from the use of the prior art pullers, thus minimizing fatigue and injury to the operator. With the easily-assembled, hand-held assembly, fittings can be quickly pulled, thereby minimizing downtime and improving productivity.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A kit for converting an air hammer into a tool for removing a friction-fit or press-fit component from a seat, the air hammer comprising a body and a reciprocating member, the kit comprising:

a pull rod adapted to be attached to the component; and a pulling member adapted to be operably interconnected with a forwardly-directed percussive force generated by the air hammer and adapted to percussively communicate with the pull rod interconnected with a component located rearwardly of the air hammer.

2. The kit of claim 1 wherein the reciprocating member is operably interconnected with the component.

3. The kit of claim 1 wherein the air hammer body is operably interconnected with the component.

4. The kit of claim 1 and further comprising a coupling comprising a tool holder, and a coupling adapter, and the coupling adapter is adapted to transfer the percussive force from the tool holder to the pull rod.

5. The kit of claim 4 wherein the coupling adapter is adapted to enable the pull rod to translate relative to the tool holder.

6. The kit of claim 4 wherein the coupling comprises a sleeve adapted to slidably communicate with the body of the hammer and fixedly retain the hammer therein.

7. The kit of claim 4 wherein the coupling is attached to a forward end of the hammer.

8. The kit of claim 4 wherein the coupling is attached to a rearward end of the hammer.

9. The kit of claim 1 and further comprising a cap having an anvil attached to the hammer for transmitting a percussive force applied to the anvil through the hammer body to the component.

10. The kit of claim 9 wherein the cap is attached to a forward end of the air hammer.

11. The kit of claim 1 wherein the pull rod is also adapted to be connected to a rearward end of the air hammer, and wherein the pulling member comprises a cap having an anvil adapted to be fixedly attached to a forward end of the air hammer, whereby the forwardly-directed percussive force generated by the air hammer creates a pulling force through a body of the air hammer when the cap is fixedly attached to the forward end of the air hammer and when the pull rod is mounted to a rearward end of the air hammer.

12. A hand-held, pneumatically-driven hammer, comprising:

a body having a mounting portion at a rear portion of the hammer, the mounting portion being adapted to fixedly couple a component thereto, the component being frictionally retained in a component seat;

whereby the hammer is thereby adapted to convert the hammer into a tool puller for removing the component from the component seat.

13. The hammer of claim 12 wherein the mounting portion is coupled to the component through a pull rod.

14. The hammer of claim 12 wherein the mounting portion comprises threads adapted for threadable connection with the component.

15. The hammer of claim 12 wherein the mounting portion comprises a bayonet-type connection.

16. The hammer of claim 12 wherein the mounting portion comprises a collar and at least one set screw.

17. The hammer of claim 12 and further comprising a pull rod mounted to the mounting portion at the rear portion of the hammer, and also further comprising a cap having an anvil fixedly attached to a forward operational end of the air hammer, wherein a forwardly-directed percussive force generated by the air hammer against the anvil of the cap creates a pulling force through the body of the hammer.

18. The hammer of claim 12 and further comprising a coupling for interconnecting the hammer and the component, the coupling mounted to the mounting portion at the rear portion of the body; and a cap having an anvil attached to a forward end of the hammer for transmitting a percussive force applied to the anvil through the hammer to the component.

* * * * *